United States Patent
Hong et al.

(10) Patent No.: US 10,146,951 B2
(45) Date of Patent: Dec. 4, 2018

(54) ELECTRONIC DEVICE AND METHOD FOR PROVIDING DRM CONTENT BY ELECTRONIC DEVICE

(71) Applicant: Samsung Electronics Co., Ltd., Suwon-si (KR)

(72) Inventors: Jaemok Hong, Seoul (KR); Jinho Ko, Hwaseong-si (KR); Namgeol Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 194 days.

(21) Appl. No.: 15/048,508

(22) Filed: Feb. 19, 2016

(65) Prior Publication Data

US 2016/0246978 A1 Aug. 25, 2016

(30) Foreign Application Priority Data

Feb. 23, 2015 (KR) .......................... 10-2015-0025180

(51) Int. Cl.
*G06F 21/00* (2013.01)
*G06F 21/62* (2013.01)
(Continued)

(52) U.S. Cl.
CPC .......... *G06F 21/6209* (2013.01); *G06F 21/10* (2013.01); *G06F 21/105* (2013.01); *G06F 21/121* (2013.01); *G06F 2221/0728* (2013.01)

(58) Field of Classification Search
CPC ........ G06F 21/10; G06F 21/105; G06F 21/12; G06F 21/121; G06F 21/125; G06F 21/62; G06F 21/6209
See application file for complete search history.

(56) References Cited

U.S. PATENT DOCUMENTS

2006/0050697 A1* 3/2006 Li ..................... H04L 29/06027
370/389
2007/0192875 A1* 8/2007 Yoon ..................... G06F 21/10
726/27
(Continued)

FOREIGN PATENT DOCUMENTS

EP 2214116 A2 8/2010
KR 2003-0094141 12/2003
(Continued)

OTHER PUBLICATIONS

"DRM Content Format; OMA-TS-DRM_DCF-V2_1-20081014-A", OMA-TS-DRM_DCF-V2_1-20081014-A, Open Mobile Alliance (OMA), 4330 La Jolla Village Dr., Suite 110 San Diego, CA 92122; USA, No. 2.1, Oct. 7, 2008 (Oct. 7, 2008), pp. 1-41, XP064124432, [retrieved on Oct. 7, 2008].

(Continued)

*Primary Examiner* — Edward Zee
(74) *Attorney, Agent, or Firm* — Jefferson IP Law, LLP

(57) ABSTRACT

An electronic device according to an embodiment of the present disclosure may include a communication unit that transmits, to an external device, at least one of a Digital Right Management (DRM) content, a DRM content header, or a DRM content body. The electronic device may also include a storage unit that stores at least one of DRM content metadata, the DRM content header, the DRM content body, or the DRM content file. A controller in the electronic device may search for DRM meta data corresponding to a DRM content requested by the external device in response to a DRM content request of the external device, package the DRM content header based on the discovered DRM meta data, search for a DRM content body corresponding to the DRM content request, and transmit the packaged DRM (Continued)

content header and the discovered DRM content body through the communication unit.

16 Claims, 10 Drawing Sheets

(51) Int. Cl.
*G06F 21/10* (2013.01)
*G06F 21/12* (2013.01)

(56) References Cited

U.S. PATENT DOCUMENTS

| | | |
|---|---|---|
| 2008/0256592 A1 | 10/2008 | Schnell et al. |
| 2010/0198915 A1 | 8/2010 | Mashita et al. |
| 2010/0268765 A1 | 10/2010 | Honjo |
| 2012/0207180 A1 | 8/2012 | Nam |
| 2013/0160146 A1* | 6/2013 | Kaiser ................ H04N 21/2541 726/30 |

FOREIGN PATENT DOCUMENTS

| | | |
|---|---|---|
| KR | 20100007670 A | 1/2010 |
| KR | 20120043528 A1 | 5/2012 |

OTHER PUBLICATIONS

Int'l Serch Report for PCT/KR2016/001724 dated May 20, 2016.
European Search Report for Appln No. 16156546.0 dated Jul. 7, 2016.

* cited by examiner

ELECTRONIC DEVICE AND METHOD FOR PROVIDING DRM CONTENT BY ELECTRONIC DEVICE

RELATED APPLICATION(S)

This application claims priority from and the benefit under 35 U.S.C. § 119(a) of Korean Patent Application No. 10-2015-0025180, filed on Feb. 23, 2015, which is hereby incorporated by reference for all purposes as if fully set forth herein.

BACKGROUND

Various embodiments of the present disclosure relate to an electronic device that can provide DRM content, and more specifically an electronic device that can dynamically generate and provide DRM content and a method for providing the DRM content by the electronic device.

Digital Rights Management (hereinafter, referred to as "DRM") refers to a technology that protects rights and interests of a content provider to prevent illegal copying, and collectively supports an entire process from content generation to distribution and management, such as use fee imposition and payment settlement services. The DRM includes all of a digital rights management technology allowing users to legally use contents and to pay an appropriate fee for the contents, software and a security technology for copyright approval and enforcement, and a payment and settlement technology. Currently, the DRM contents to which the DRM technology is applied have been widely used for various contents widely transmitted to users through a network or the like.

However, when providing DRM contents, if the DRM contents of original contents are generated and stored in advance, a lot of storage space is required, and some DRM contents may not have been generated to provide to individual users. Further, when DRM contents are generated specifically for a user, there is a disadvantage of extra time taken in providing the DRM contents.

SUMMARY

Various embodiments of the present disclosure provide an electronic device that can provide various forms of DRM contents depending on users and a method for providing DRM contents by the electronic device.

In accordance with various embodiments of the present disclosure, an electronic device is provided. The electronic device may include a communication unit configured to transmit at least one of a Digital Rights Management (DRM) content file, a DRM content header, and a DRM content body to an external device. The electronic device may also include a storage unit configured to store at least one of DRM content metadata, the DRM content header, the DRM content body, and the DRM content file. A controller in the electronic device may be configured to search for DRM metadata to locate discovered DRM metadata corresponding to a DRM content request by the external device, generate the DRM content header based on the discovered DRM metadata; search for the DRM content body to locate discovered DRM content body corresponding to the DRM content request, and transmit the DRM content header and the discovered DRM content body through the communication unit.

In accordance with various embodiments of the present disclosure, a method for providing a DRM content is provided. The method may include receiving a DRM content request from an external device, checking DRM metadata to locate discovered DRM metadata corresponding to the DRM content request from the external device, generating a DRM content header on the basis of the discovered DRM metadata, checking at least one DRM content body to locate a discovered DRM body corresponding to the DRM content request by the external device, and transmitting the DRM content header and the discovered DRM content body to the external device.

An electronic device and a method for providing DRM contents by the electronic device according to various embodiments of the present disclosure may provide various types of DRM contents suited for each user or country.

An electronic device and a method for providing DRM contents by the electronic device according to various embodiments of the present disclosure may reduce content storage space as well as increase content download speeds.

An electronic device and a method for providing DRM contents by the electronic device according to various embodiments of the present disclosure may provide a DRM content in which a DRM content header is dynamically changed.

An electronic device and a method for providing DRM contents by the electronic device according to various embodiments of the present disclosure may provide an embedded license function for each user at the time of providing DRM contents.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

The detailed description described below will present representative embodiments of the present disclosure. Terms used in this disclosure for convenience of description do not limit the scope of the present disclosure, and may be applied to other systems having a similar technical background.

In the accompanying drawings, some components may be exaggerated or schematically illustrated for ease of explanation. Therefore, a size of a component may not precisely reflect the actual size nor relative sizes of different components. Thus, the present disclosure is not limited by the relative sizes shown in the accompanying drawings.

Further, the singular form used in the present disclosure is intended to include the plural form unless clearly indicated otherwise. The term "and/or" used in the present specification should be understood as including any and all combinations of one or more of the associated listed items. Stating "at least one of A, B, and C" indicates any combination of A, B, and C, including multiples of A, B, and/or C.

Further, the term "unit," "module," etc. used in the present disclosure implies a unit for performing at least one function or operation, which can be implemented by hardware, software, or a combination of hardware and software.

In the present disclosure, DRM metadata generally refers to information such as a content title, a content ID, and a license Uniform Resource Locator (URL) required for generating or managing a DRM content. A DRM content file may comprise a DRM content header that includes DRM metadata. According to an embodiment, the DRM content header may also include a DRM license for the DRM content. A DRM content body refers to an area including an original content that requires the DRM license. The DRM content file refers to a DRM content in which the DRM content header and the DRM content body are combined. Accordingly, DRM content may refer to any one of DRM content file, DRM content header, and DRM content body.

Hereinafter, the present disclosure will be described with reference to the accompanying drawings.

Figure 1:
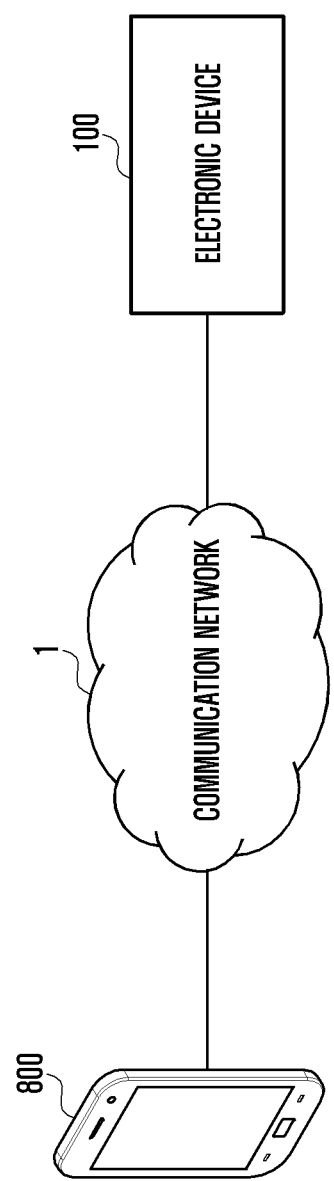
FIG. 1 illustrates a DRM content providing system according to various embodiments of the present disclosure.

FIG. 1 illustrates a DRM content providing system according to various embodiments of the present disclosure. There is shown in FIG. 1 an electronic device 100 and a client device 800 that may communicate with each other via the communication network 1.

According to various embodiments of the present disclosure, the client device 800 may be, for example, a tablet Personal Computer (PC), a mobile phone, a video phone, an e-book reader, a desktop personal computer, a laptop PC, a netbook computer, a Personal Digital Assistant (PDA), a Portable Multimedia Player (PMP), an MP3 player, a mobile medical device, a camera or a wearable device (for example, a Head-Mounted-Device (HMD) such as electronic glasses, an electronic clothing, electronic bracelets, an electronic necklace, an electronic accessory, electronic tattoo, a smart home appliance or a smart watch).

The client device 800 may include various types of electronic devices that may make a request to an external device for a DRM content, and may store or reproduce the DRM content after receiving the DRM content.

The client device 800 may transmit a DRM content request to an electronic device through the communication network 1. According to various embodiments of the present disclosure, the client device 800 may request the electronic device 100 for the DRM content header and/or the DRM content body through the communication network 1. The client device 800 may receive the DRM content file, the DRM content header, or the DRM content body from the electronic device 100 through the communication network 1.

The communication network 1 may include a wired communication network or a wireless communication network. Wireless communication may include at least one of, for example, Wi-Fi, Bluetooth (BT), Near Field Communication (NFC), a Global Positioning System (GPS), and cellular communication (for example, Long Term Evolution (LTE), Long Term Evolution-Advanced (LTE-A), Code Division Multiple Access (CDMA), Wideband CDMA (WCDMA), Universal Mobile Telecommunication System (UMTS), Wireless Broadband (WiBro), or Global System for Mobile communication (GSM)). Wired communication may include at least one of, for example, a universal serial bus (USB), a high definition multimedia interface (HDMI), recommended standard 232 (RS-232), and a plain old telephone Service (POTS). According to various embodiments of the present disclosure, the communication network 1 may include at least one among a computer network, the Internet, the Internet of Things, or a telephone network.

According to an embodiment, the communication network 1 may include a Content Delivery Network (CDN). According to an embodiment, the CDN may include distributed storage spaces that store at least one of the DRM content header, the DRM content body, and the DRM content file.

Upon receiving a DRM content request from the client device 800 through the communication network 1, the electronic device 100 may provide a DRM content corresponding to the DRM content request to the client device 800. For example, the electronic device 100 may transmit at least one of the DRM content, the DRM content header and the DRM content body to the client device 800 in response to the DRM content request.

Figure 2:
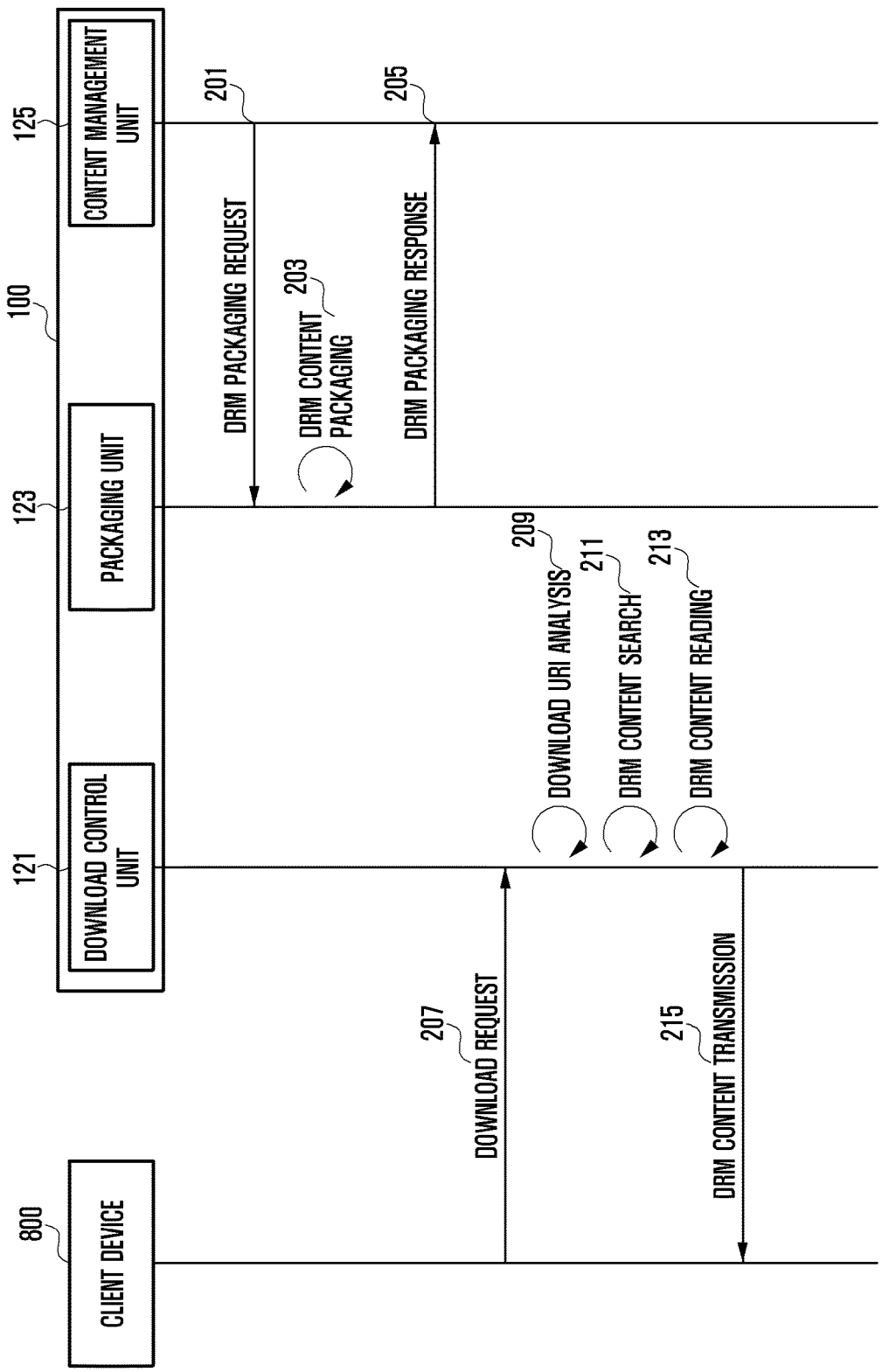
FIG. 2 is a signal flowchart illustrating an operation of providing DRM content by an electronic device according to various embodiments of the present disclosure.

FIG. 2 is a signal flowchart illustrating an operation of providing DRM content by an electronic device 100 according to various embodiments of the present disclosure.

According to an embodiment of the disclosure, the electronic device 100 may package DRM contents in a pre-packaging scheme. The pre-packaging scheme refers to encrypting and packaging an original content prior to a DRM content request by the client device 800. For example, the electronic device 100 may package a DRM content body in the pre-packaging scheme.

In operation 201, the content management unit 125 may make a request to the packaging unit 123 for DRM packaging. For example, the content management unit 125 may make a request to the packaging unit 123 to package a DRM content body. The content management unit 125 may transmit an original content to the packaging unit 123. The content management unit 125 may have received the original content from an external device or through an external network. The content management unit 125 may have stored the received original content.

In operation 203, the packaging unit 123 may package the DRM content body. For example, the packaging unit 123 may generate a DRM content body by encrypting the original content. The packaging unit 123 may encrypt and package the original content by using any of a variety of encryption methods. The packaging unit 123 may encrypt and package the original content to generate a DRM content body.

In operation 205, the packaging unit 123 may transmit a DRM packaging response to the content management unit 125. For example, the packaging unit 123 may transmit the packaged DRM content body to the content management unit 125. The content management unit 125 may store the received DRM content body in a local storage unit or an external storage space. According to an embodiment, when using a Content Delivery Network (CDN), the content management unit 125 may store a DRM content file, a DRM content body, or DRM content header in a plurality of distributed storage spaces connected through the network.

In operation 207, the client device 800 may send a download request to, for example, to the download control unit 121 (FIG. 6) of the electronic device 100 for the DRM content body. For example, the client device 800 may transmit to the electronic device 100 information including at least one of the following corresponding to a particular DRM content: a title, an ID, an address, and a download Uniform Resource Identifier (URI) along with the download request.

In operation 209, the download control unit 121 may analyze the download request received from the client device 800. For example, the download control unit 121 may check the download URI included in the download request. The download URI may include the type and address information of the DRM content requested by the client device 800. That is, the download control unit 121 may analyze the download request received from the client device 800 and check for the type of DRM content (in this case the DRM content body) requested by the client device 800.

In operation 211, the download control unit 121 may search for the DRM content body requested by the client device 800. For example, the download control unit 121 may search for the DRM content body that corresponds to the download request of the client.

In operation 213, the download control unit 121 may copy the DRM content body that matches the request. The download control unit 121 may then prepare to transmit the matching DRM content body to the client device 800.

In operation 215, the download control unit 121 may transmit to the client device 800 the DRM content body that corresponds to the download request of the client device 800.

Figure 3:
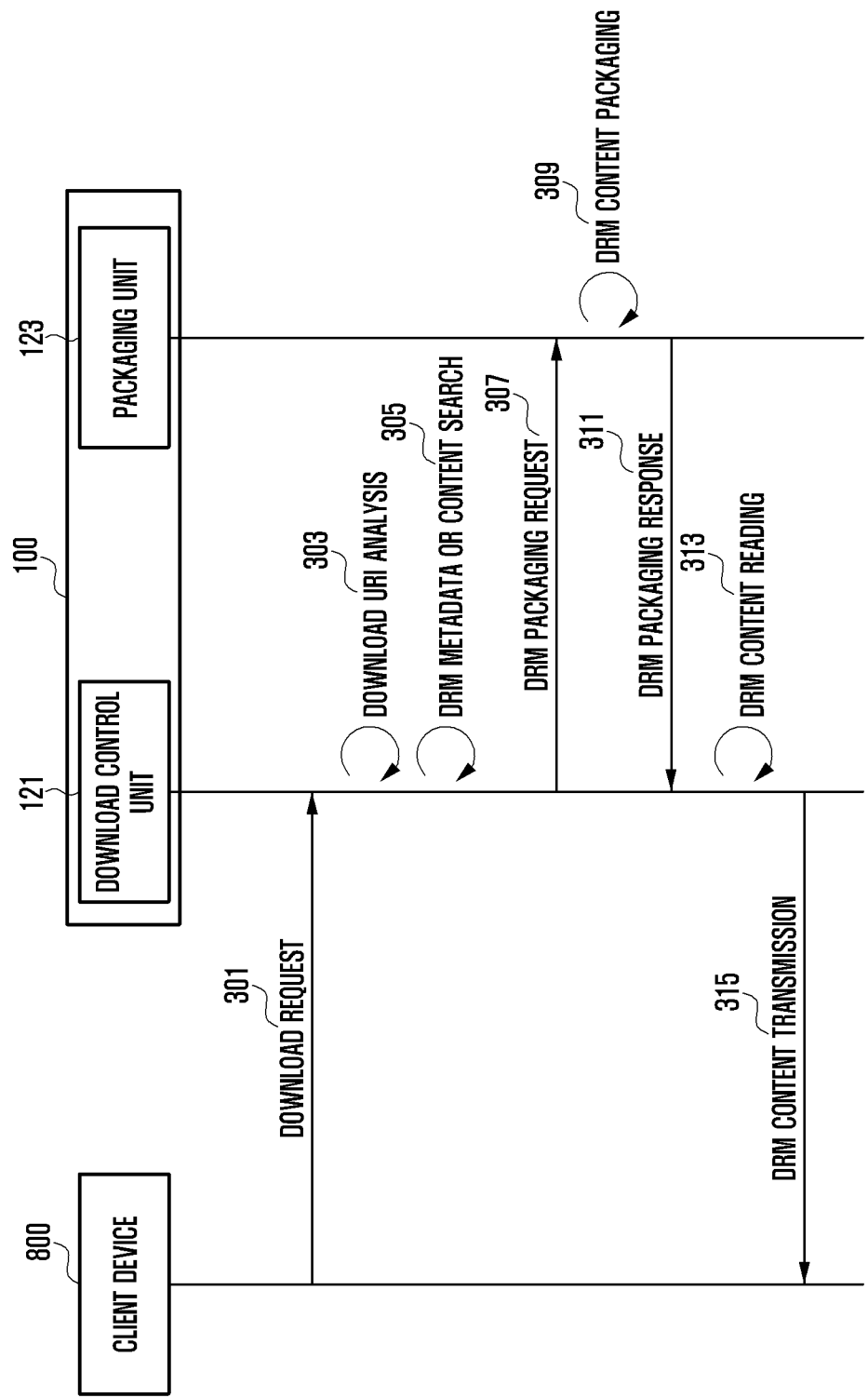
FIG. 3 is a signal flowchart illustrating an operation of providing DRM content by an electronic device according to various embodiments of the present disclosure.

FIG. 3 is a signal flowchart illustrating an operation of providing DRM content by the electronic device 100 according to various embodiments of the present disclosure.

According to an embodiment of the disclosure, the electronic device 100 may package DRM contents in an on-the-fly scheme. The on-the-fly packaging scheme refers to a method of packaging original content that corresponds to a DRM content request from the client device 800. In this example, the electronic device 100 may package a DRM content header using the on-the-fly packaging scheme.

In operation 301, the client device 800 may make a download request to, for example, the download control unit 121 (FIG. 6) of the electronic device 100 for a DRM content header. For example, the client device 800 may transmit to the electronic device 100 information including at least one of the following corresponding to a particular DRM content: a title of a particular DRM content, an ID, an address, and a download Uniform Resource Identifier (URI) along with the download request.

In operation 303, the download control unit 121 may analyze the download request received from the client device 800. For example, the download control unit 121 may check the download URI included in the download request. The download control unit 121 may analyze the download request received from the client device 800 and check for the type of DRM contents (in this case, the DRM content header) requested by the client device 800.

In operation 305, the download control unit 121 may search for DRM contents or DRM metadata requested by the client device 800. For example, the download control unit 121 may query for DRM contents or DRM metadata that matches the download request of the client.

In operation 307, the download control unit 121 may transmit a DRM packaging request to the packaging unit 123. The download control unit 121 may transmit the matching DRM metadata along with the DRM packaging request to the packaging unit 123.

In operation 309, the packaging unit 123 may package the DRM content header. The DRM content header may include at least one of a content title, a content ID, and a license URL. For example, the packaging unit 123 may generate a DRM content header including one or more DRM metadata. According to an embodiment, the packaging unit 123 may include the DRM license in the DRM content header. The DRM license may include a key that can decrypt the corresponding the DRM content. The DRM license may include the use rights information on the DRM content. For example, the DRM license may include information on providers of the corresponding DRM content, information on the user allowed to have the use rights, a use period or an expiration period of the DRM content, a usable time, and the like. The packaging unit 123 may store the generated DRM content header in the storage unit.

In operation 311, the packaging unit 123 may transmit a DRM packaging response to the download control unit 121. For example, the packaging unit 123 may transmit the packaged DRM content header to the download control unit 121. The download control unit 121 may store the received DRM content in the local storage unit or an external storage space.

In operation 313, the download control unit 121 may prepare to transmit the requested DRM content header to the client device 800. According to an embodiment, the download controller 121 may prepare to directly transmit the DRM content header that is received from the packaging unit 123 to the client device 800.

In operation 315, the download control unit 121 may transmit to the client device 800 the DRM content header that corresponds to the download request of the client device 800.

Figure 4:
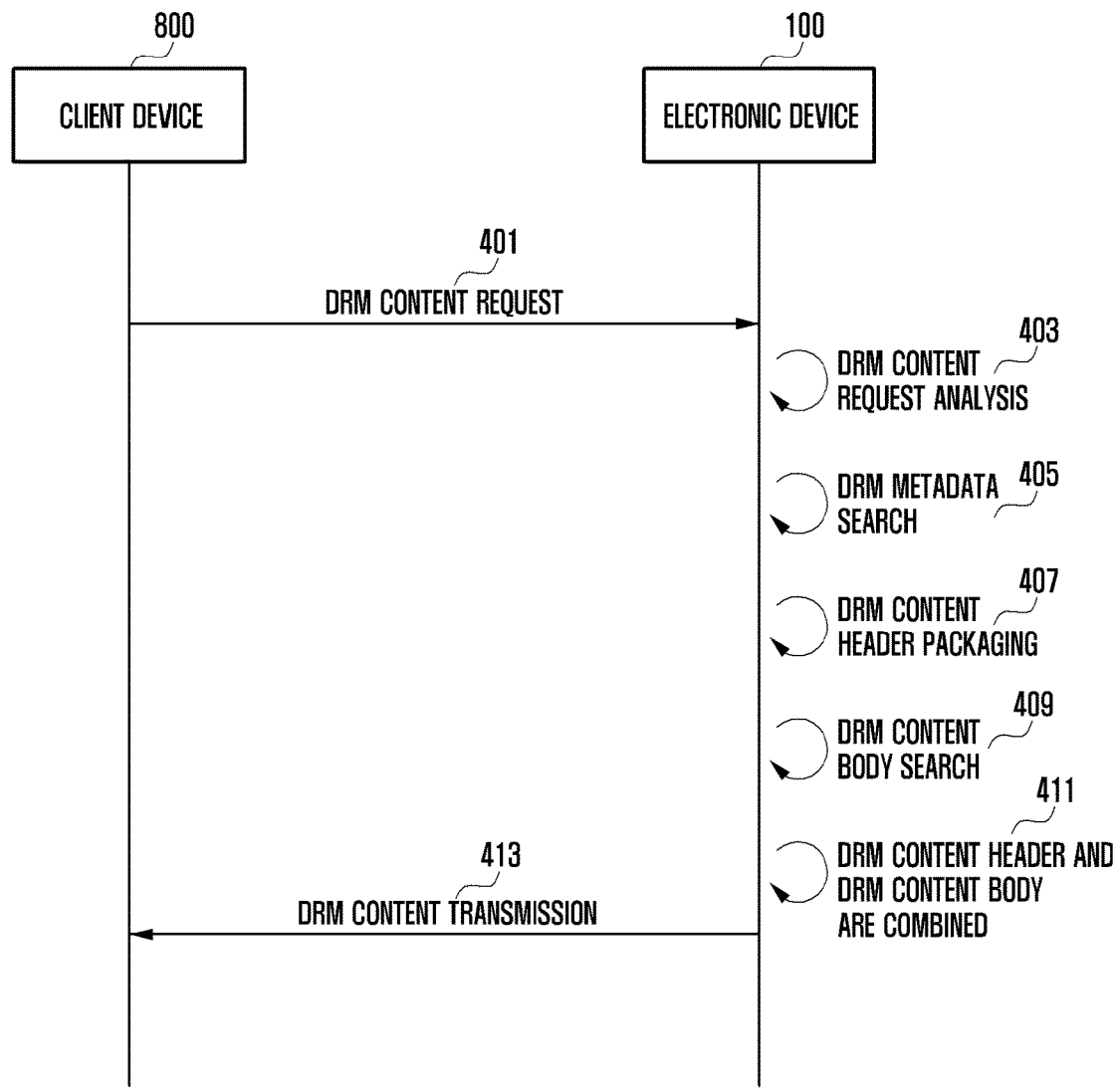
FIG. 4 a signal flowchart illustrating an operation of providing DRM content by an electronic device according to various embodiments of the present disclosure.

FIG. 4 is a signal flowchart illustrating an operation of providing DRM content by an electronic device 100 according to various embodiments of the present disclosure. FIG. 4 describes the electronic device 100 combining a DRM content header and a DRM content body before delivering the DRM content file to the client device 800.

In operation 401, the client device 800 may transmit a DRM content request to the electronic device 100. The client device 800 may transmit information including at least one of a content title, a content type, a content address, and a download URI to the electronic device 100 along with the DRM content request.

In operation 403, the electronic device 100 may analyze the DRM content request received from the client device 800. The electronic device 100 may analyze the DRM content request and check what kind of content (in this case, the DRM content file) the client device 800 wants.

In operation 405, in response to the received DRM content request, the electronic device 100 may search for DRM metadata corresponding to the content requested by the client device 800. The DRM metadata may include at least one of a content title, a content ID, and a license URL. According to an embodiment, the electronic device 100 may also search for the DRM license for the content.

In operation 407, the electronic device 100 may package the DRM content header based on the DRM metadata. For example, the electronic device 100 may generate a DRM content header including at least one piece of DRM metadata. According to an embodiment, the electronic device 100 may also package a DRM content header and a DRM license by including the DRM license in the DRM content header.

In operation 409, the electronic device 100 may search for, in response to the DRM content request of the client device 800, the DRM content body corresponding to the DRM content requested by the client device 800. The DRM content body may be a pre-packaged one when the original content is registered in the electronic device 100. For example, the electronic device 100 may package an original content stored locally or an original content received from the external device in the DRM content body, and then have stored the packaged DRM content body prior to the DRM content request of the client device 800.

In operation 411, the electronic device 100 may generate a DRM content file by combining the packaged DRM content header and the appropriate DRM content body. In operation 413, the electronic device 100 may transmit the generated DRM content file to the client device 800.

Figure 5:
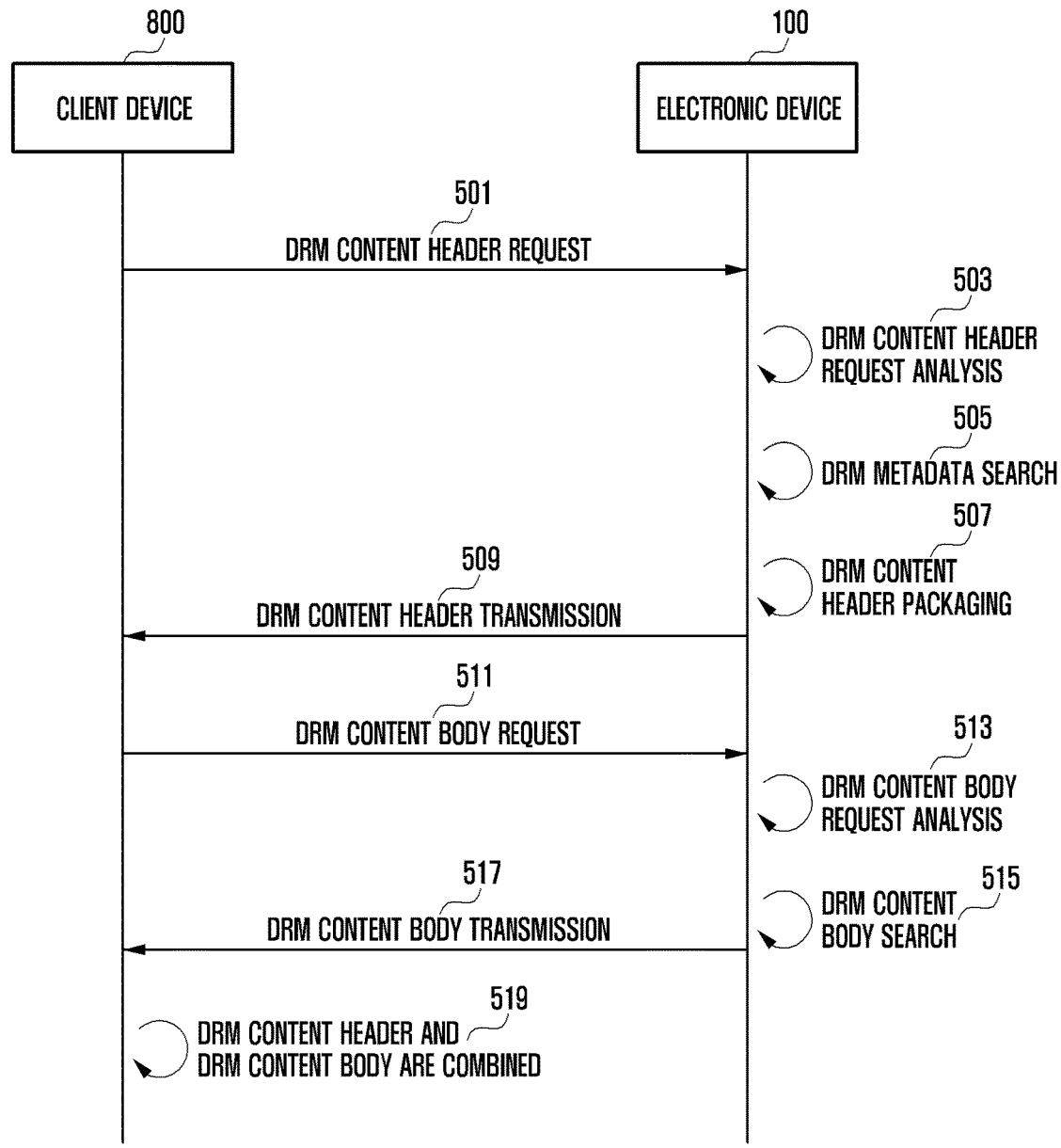
FIG. 5 is a signal flowchart illustrating an operation of providing DRM content by an electronic device according to various embodiments of the present disclosure.

FIG. 5 is a signal flowchart illustrating an operation of providing DRM contents by an electronic device 100 according to various embodiments of the present disclosure. FIG. 5 describes the client device 800 receiving a separate DRM content header and a separate DRM content body, and then combining the two according to an embodiment of the present disclosure.

In operation 501, the client device 800 may transmit a DRM content request, for example, for a DRM content header, to the electronic device 100. The client device 800 may transmit information corresponding to a desired DRM content (for example, a content title, a content type, a download URI, and the like) to the electronic device 100.

In operation 503, the electronic device 100 may analyze the received DRM content request. For example, the electronic device 100 may analyze the DRM content request to determine the DRM content the client device 800 wants (in this example, a DRM content header).

In operation 505, in response to the request of the client device 800, the electronic device 100 may search for DRM metadata of the DRM content requested by the client device 800. For example, the electronic device 100 may search for metadata or a DRM license associated with a particular original content.

In operation 507, the electronic device 100 may package the DRM content header based on the DRM metadata. For example, the electronic device 100 may generate a DRM content header including at least one piece of DRM metadata. According to an embodiment, the electronic device 100 may generate the DRM content header by packaging the DRM metadata and the DRM license together.

In operation 509, the electronic device 100 may transmit the packaged DRM content header to the client device 800.

In operation 511, the client device 800 may transmit a DRM content request for a DRM content body to the electronic device 100. The client device 800 may transmit information that can identify the desired DRM content along with the DRM content request to the electronic device 100.

In operation 513, the electronic device 100 may analyze the DRM content request. For example, the electronic device 100 may identify the DRM content body the electronic client 800 has requested.

In operation 515, in response to a client request, the electronic device 100 may search for the DRM content body requested by the client device 800. The DRM content body may have been pre-packaged and generated by the electronic device 100. For example, the electronic device 100 may have generated and stored a DRM content body that was produced by encrypting the original content when the original content was acquired or registered.

In operation 517, the electronic device 100 may transmit to the client device 800 the DRM content body corresponding to the DRM request.

In operation 519, the client device 800 may generate a DRM content file by combining the DRM content header and the DRM content body received from the electronic device 100. For example, the client device 800 may generate one DRM content file by merging the DRM content header and the DRM content body.

Figure 6:
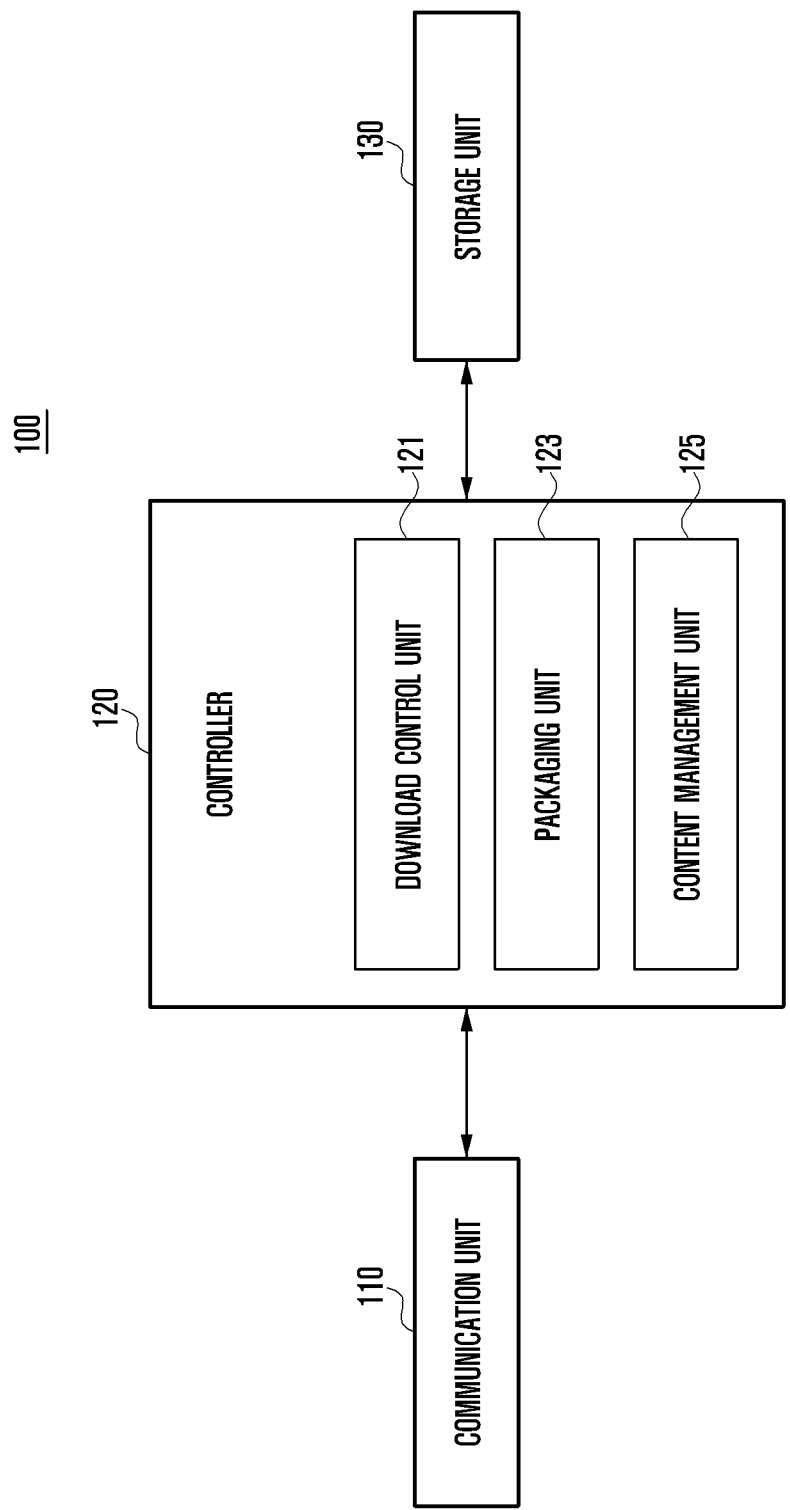
FIG. 6 illustrates a block diagram of an electronic device according to various embodiments of the present disclosure.

FIG. 6 illustrates a block diagram of an electronic device 100 according to various embodiments of the present disclosure.

According to an embodiment of the present disclosure, the electronic device 100 may include a communication unit 110, a controller 120, and a storage unit 130.

The communication unit 110 may transmit and receive data when communicating with other electronic devices (e.g., a client device 800) connected to the electronic device 100 through a network. According to an embodiment, the communication unit 110 may include a cellular module, a WIFI module, a BT module, a GPS module, a NFC module and a Radio Frequency (RF) module.

According to an embodiment, the communication unit 110 may transmit a DRM content header, the DRM content body, or the DRM content file to the client device 800. For example, the communication unit 110 may have received a DRM request from the client device 800 for a DRM content file, a DRM content header, or a DRM content body. According to an embodiment, the communication unit 110 may transmit and receive data to and from the external device (e.g., the client device 800) through a wired or wireless network.

The controller 120 may search for DRM metadata corresponding to the DRM content request received from the client device 800. The controller 120 may generate and send the DRM content header based on the DRM content request. Or, the controller 120 may generate and send the DRM content body corresponding to the DRM content request. The controller 120 may also generate and send the DRM content file the DRM content header and the DRM content body.

According to an embodiment of the present disclosure, the controller 120 may include a download control unit 121, a packaging unit 123, and a content management unit 125.

The download control unit 121 may receive a download request (e.g., a DRM content request) from the client device 800. The download control unit 121 may analyze the DRM content request of the client device 800 and then search for the content the client device 800 wants. The download control unit 121 may search for DRM metadata, DRM content header, DRM content body, a DRM content file that correspond to the DRM content request of the client device 800. The download control unit 121 may transmit an appropriate one of the discovered DRM metadata, the DRM content header, the DRM content body, or the DRM content file to the packaging unit 123.

According to an embodiment, the download control unit 121 may search for a particular DRM content header, a DRM content body, or a DRM content to transmit to the client device 800 from among the DRM content headers, the DRM content bodies, and the DRM contents stored in the storage unit 130.

The download control unit 121 may transmit to the client device 800 the DRM content header, the DRM content body, or the DRM content file corresponding to the DRM content request. According to an embodiment, the download control unit 121 may transmit the requested DRM content to the client device 800 using a Content Delivery Network (CDN). For example, the download control unit 121 may store the DRM content in a distributed storage space of the CDN. Accordingly, when a DRM content request is received from the client device 800, the download control unit 121 may transmit to the client device 800 the appropriate DRM content stored in the storage space of the CDN closest to the client device 800.

According to an embodiment, the download control unit 121 may include a download server for providing DRM contents. For example, the download control unit 121 may separately include a communication module for transmitting and receiving data and a storage space.

The packaging unit 123 may generate DRM contents. For example, the packaging unit 123 may package a DRM content header or a DRM content body or a DRM content file. The packaging unit 123 may include a packaging server for providing DRM contents. For example, the packaging unit 123 may separately include a storage space and a communication module for transmitting and receiving data.

According to an embodiment, the packaging unit 123 may package the DRM content header based on the DRM content metadata. According to an embodiment, the packaging unit 123 may package a DRM license and a DRM content header by including the DRM license in the DRM content header. The DRM license may include a key that can decrypt the DRM content or use right information of the DRM content.

According to an embodiment, the packaging unit 123 may encrypt and then package the original content. For example, the packaging unit 123 may generate a DRM content body including the encrypted original content.

According to an embodiment, the packaging unit 123 may generate a DRM content file by combining the DRM content header and the DRM content body. For example, the packaging unit 123 may generate one DRM content file by merging the DRM content header and the DRM content body.

The content management unit 125 may manage DRM contents (e.g., a DRM content header, a DRM content body, a DRM content file). The content management unit 125 may manage the DRM contents in conjunction with the packaging unit 123. For example, the content management unit 125 may register an original content stored inside the electronic device 100 or an original content received from an external device. The content management unit 125 may control a DRM packaging process of the original content. For example, the content management unit 125 may request the packaging unit 123 to package the DRM content header. The content management unit 125 may request the packaging unit 123 to package an original content into a DRM content body. The content management unit 125 may request the packaging unit 123 to generate a DRM content file (e.g., merging of the DRM content header and the DRM content body). According to an embodiment, the content management unit 125 may control data transmission and reception by the download control unit 121. According to an embodiment, the content management unit 125 may include a Content Management System (CMS) for providing the DRM content.

Referring to FIG. 6, the controller 120 includes the download control unit 121, the packaging unit 123, and the content management unit 125 as separate structures. However, various embodiments of the disclosure need not be so limited. The download control unit 121, the packaging unit 123, the content management unit 125 may be implemented as a single integrated device (e.g., a controller 120) or a single integrated module. According to an embodiment, the download controller 121, the packaging unit 123, and the content management unit 125 can be separate devices in different integrated circuit chips.

The storage unit 130 may store DRM content metadata, DRM content headers, DRM content bodies, DRM licenses, and/or DRM content files.

Figure 7:
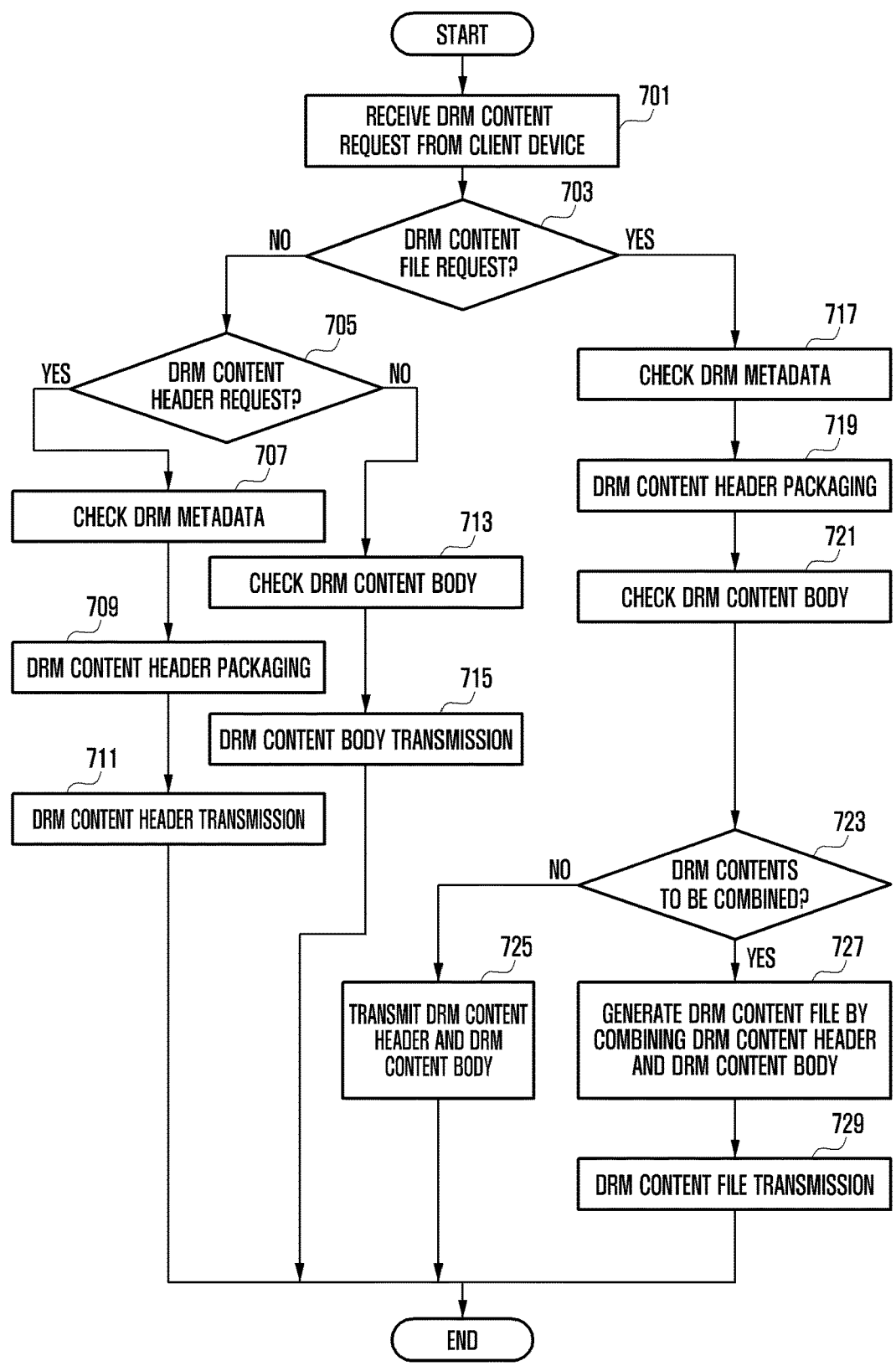
FIG. 7 is a flowchart illustrating a method of providing DRM content by an electronic device according to various embodiments of the present disclosure.

FIG. 7 is a flowchart illustrating a method of providing DRM content by an electronic device 100 according to various embodiments of the present disclosure.

In operation 701, the electronic device 100 may receive the DRM content request from the client device 800. For example, the electronic device 100 may receive a download request of a particular content from the client device 800. The electronic device 100 may receive, from the client device 800, information that can identify the particular content along with the DRM content request. For example, the electronic device 100 may receive information on a particular content title, an address, a download URI, type, etc.

In operation 703, the electronic device 100 may analyze the request of the client device 800. For example, the electronic device 100 may check that the DRM request from the client device 800 corresponds to the request for a DRM content file that includes a DRM content header and a DRM content body. The electronic device 100 may perform operation 717 when the request of the client device 800 corresponds to a request for a DRM content file. The electronic device 100 may perform operation 705 when the request of the client device 800 does not correspond to a request for a DRM content file.

In operation 705, the electronic device 100 may check whether the request of the client device 800 corresponds to the request for a DRM content header. The electronic device 100 may perform operation 707 when the request of the client device 800 corresponds to a request for a DRM content header. The electronic device 100 may perform operation 713 when the request from the client device 800 does not correspond to a request for a DRM content header. For example, the electronic device 100 may perform operation 713 when the request from the client device 800 corresponds to a request for a DRM content body.

In operation 707, the electronic device 100 may check the DRM metadata. For example, the electronic device 100 may search for at least one piece of DRM metadata corresponding to the DRM content request from the client device 800. The electronic device 100 may search for at least one of a content title, a content ID, a license URL, and a DRM license associated with the requested DRM content.

In operation 709, the electronic device 100 may package the DRM content header based on the discovered DRM metadata. For example, the electronic device 100 may generate the DRM content header including the discovered DRM metadata. According to an embodiment, the electronic device 100 may package the corresponding DRM license for the DRM content with the DRM content header.

In operation 711, the electronic device 100 may transmit the packaged DRM content header to the client device 800.

In operation 713, the electronic device 100 may search for the DRM content body corresponding to the DRM content requested by the client device 800. According to an embodiment, the electronic device 100 may have generated a DRM content body encrypting the original content, prior to the request of the client device 800. The electronic device 100 may search for a particular DRM content body corresponding to the request of the client device 800 among, for example, stored multiple DRM content bodies.

In operation 715, the electronic device 100 may transmit the discovered DRM content body to the client device 800. According to an embodiment, the electronic device 100 may transmit the DRM content body to the client device 800 using the Content Delivery Network (CDN). The CDN refers to a system that stores data in a storage space (e.g., a storage server) and then transmits the data to efficiently transmit the content to a user (e.g., the client device 800) in a network environment. For example, the electronic device 100 may include a storage server that is distributed in the CDN.

In operation 717, the electronic device 100 may check the DRM metadata. For example, the electronic device 100 may search for one or more DRM metadata corresponding to the DRM content requested by the client device 800.

In operation 719, the electronic device 100 may package the DRM content header based on the discovered DRM metadata. According to an embodiment, the electronic device 100 may package the DRM license along with the DRM content header.

In operation 721, the electronic device 100 may check the DRM content body. For example, the electronic device 100 may search for a particular DRM content body corresponding to the request of the client device 800 among the previously packaged and then stored multiple DRM content bodies.

In operation 723, the electronic device 100 may determine whether to combine the DRM contents. For example, the electronic device 100 may determine whether to generate a DRM content file by merging the DRM content header and the DRM content body. According to an embodiment, the electronic device 100 may include a merger to merge the DRM content header and the DRM content body. The electronic device 100 may determine whether to combine the DRM content depending on whether the DRM content header and the DRM content body can be autonomously merged or not. According to an embodiment, the electronic device 100 may check whether the DRM content of the client device 800 can be combined. For example, the electronic device 100 may communicate with the client device 800 and check whether the client device 800 can combine the DRM contents. According to an embodiment, the client device 800 may also include information in the DRM content request on whether the request is for a combined DRM content or separate DRM content header and DRM content body. The electronic device 100 may analyze the DRM content request of the client device 800 and then determine whether to combine the DRM content.

The electronic device 100 may perform operation 725 in the case of the un-combined DRM content. The electronic device 100 may perform operation 727 in the case of the combined DRM content.

In operation 725, the electronic device 100 may transmit the DRM content header and the DRM content body to the client device 800 separately.

In operation 727, the electronic device 100 may combine the DRM content header and the DRM content body. For example, the electronic device 100 may generate one DRM content file by merging the DRM content header and the DRM content body. According to an embodiment, the electronic device 100 may add the DRM license to the generated DRM content file.

In operation 729, the electronic device 100 may transmit the generated DRM content file to the client device 800.

According to various embodiments of the present disclosure, the electronic device 100 may dynamically package and provide the DRM content header if there is such a client request, or dynamically create the DRM content body and then transmit the DRM content body according to the client request. Alternatively, the DRM content header and the DRM content body may already be packaged. Thus, the electronic device 100 may efficiently manage the storage space, improve the content providing speed, and at the same time, provide various forms of content headers (or license) depending on the user and the content.

Figure 8:
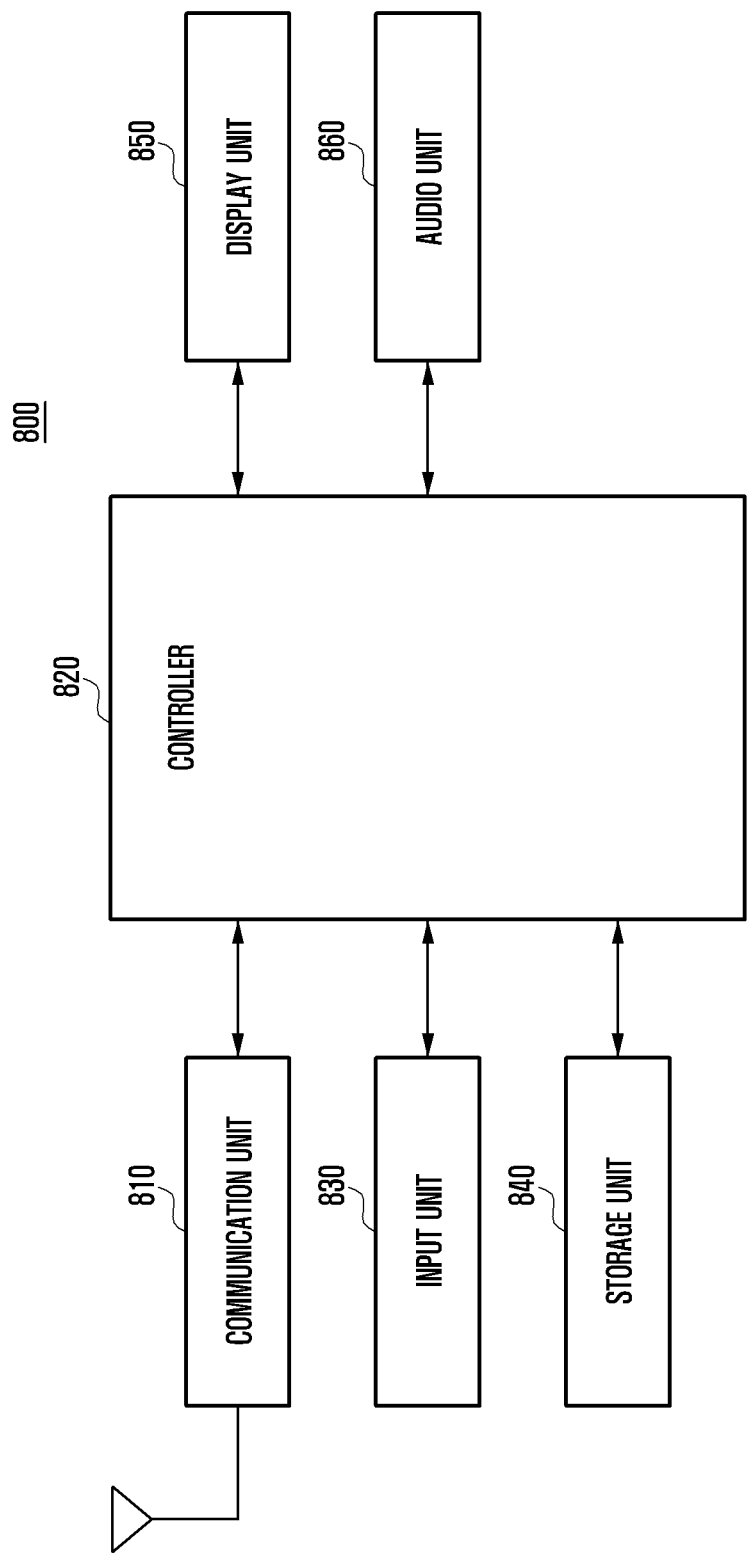
FIG. 8 illustrates a block diagram of a client device according to various embodiments of the present disclosure.

FIG. 8 illustrates a block diagram of a client device 800 according to various embodiments of the present disclosure.

According to an embodiment of the present disclosure, the client device 800 may include a communication unit 810, a controller 820, an input unit 830, a storage unit 840, and a display unit 850, and an audio unit 860.

The communication unit 810 may transmit and receive data in communication between other electronic devices (e.g., an electronic device 100) connected to the client device 800 via a network. According to an embodiment, the communication units 810 and 110 may include a cellular module (not shown), a WIFI module (not shown), a BT module (not shown), a GPS module (not shown), a, NFC module (not shown), and a Radio Frequency (RF) module (not shown).

The cellular module may provide a voice call, a video call, a Short Message Service (SMS), an Internet service, etc. through a communication network (for example, LTE, LTE-A, CDMA, WCDMA, UMTS, WiBro, GSM, etc.). The cellular module may perform at least a part of the functions that can be provided by the controller 820. For example, the cellular module may perform at least a part of the multimedia control functions.

According to an embodiment, the communication unit 810 may transmit a download request (e.g., a DRM content header request, a DRM content body request, or a DRM content file request, etc.) to the electronic device 100.

The controller 820 may execute an operating system and/or an application program so as to control a plurality of hardware and/or software components connected to the controller 820, and may execute data processing and operation associated with various types of data including multimedia data. The controller 820 may be implemented by, for example, a System on Chip (SoC). According to an embodiment, the controller 820 may be an Application Processor (AP). The controller 820 may further include a Graphic Processing Unit (GPU).

According to an embodiment, the controller 820 may combine the DRM content header and DRM content body received from the electronic device 100 to generate the DRM content file. The controller 820 may store the received DRM content header, the DRM content body, or the generated DRM content file in the storage unit 840. According to an embodiment, the controller 820 may include a DRM content merger module (not shown) for generating the DRM content file.

The input unit 830 may include a touch panel (not shown), a (digital) pen sensor (not shown), a key (not shown), or an ultrasonic input device (not shown). The touch panel may recognize a touch input based on at least one of, for example, a capacitive scheme, a resistive scheme, an infrared scheme, and an ultrasonic scheme. The touch panel may include a control circuit (not shown). A capacitive touch panel may recognize a physical contact or proximity. The touch panel may further include a tactile layer (not shown) to provide a tactile response to a user.

The (digital) pen sensor may be embodied, for example, using a method identical or similar to a method of receiving a touch input of a user, or using a separate recognition sheet. The key may be, for example, a physical button, an optical key, and/or a keypad. The ultrasonic input device may detect an ultrasonic wave and identify data in the client device 800 through an input tool for generating an ultrasonic signal and may perform wireless recognition. According to an embodiment, the client device 800 may receive user input from an external device (for example, a computer or a server) connected using the communication unit 810.

According to an embodiment, the input unit 830 may receive, from the user, an input for requesting the download of the DRM contents, etc. or an input for reproducing, editing, or managing the DRM content.

The storage unit 840 may include at least one of an internal memory and an external memory.

The internal memory 142 may include at least one of volatile memory (e.g. a Dynamic Random Access Memory (DRAM) and a Synchronous Dynamic RAM (SDRAM)) and non-volatile memory (e.g. a One Time Programmable Read-Only Memory (OTPROM), a Programmable ROM (PROM), an Erasable and Programmable ROM (EPROM), an Electrically Erasable and Programmable ROM (EEPROM), a Mask ROM, and a Flash ROM), a Hard Disk Drive (HDD), and a Solid State Drive (SSD)). According to an embodiment, the controller 820 can process a command or data received from at least one of the non-volatile memory and/or other components by loading the command or the data in the volatile memory. Further, the controller 820 may store the data received from or generated by other components in the volatile memory and/or non-volatile memory.

The external memory may include at least one of, for example, a Compact Flash (CF), a Secure Digital (SD), a Micro Secure Digital (Micro-SD), a Mini Secure Digital (Mini-SD), an extreme Digital (xD) and a memory stick.

The storage unit 840 may store an operating system for controlling a resource of the portable terminal 100, and an application program for an operation of an application. The operating system may include a kernel, middleware, an application program interface (API), and the like. Examples of the operating system may include ANDROID, IOS, WINDOWS, SYMBIAN, TIZEN, and BADA. According to an embodiment, the storage unit 840 may store instructions or a program for performing a method for providing the DRM content.

According to an embodiment, the storage unit 840 may store at least one of DRM metadata, a DRM license, a DRM content file, a DRM content header, and a DRM content body.

The display unit 850 may include a panel (not shown), a hologram apparatus (not shown), or a projector (not shown). For example, the panel may be a Liquid Crystal Display (LCD), an Active Matrix Organic Light Emitting Diode (AM-OLED), or the like. For example, the panel may be implemented to be flexible, transparent, and/or wearable. The panel may be configured by a touch panel and a single module. The hologram device may show a three dimensional image in the air using interference of light. The projector may display an image by projecting light onto a screen. The screen may be located, for example, inside or outside the client device 800. According to an embodiment, the display unit 850 may further include a control circuit (not shown) for controlling a panel, a hologram apparatus, or a projector.

According to an embodiment, the display unit 850 may output the image information of the DRM content.

According to an embodiment, the display unit 850 can be implemented as an integral form with the input unit 830. For example, the display unit 850 and the input unit 830 may be a single touch screen. The touch screen may include a display panel for displaying data and a touch panel for receiving the user input.

The audio unit 860 may convert voice to electrical signals, and vice versa. For example, the audio unit 860 may include at least one among a speaker (not shown), a receiver (not shown), an earphone (not shown), or a microphone (not shown) and convert audio information to be input or output. According to an embodiment, the audio unit 860 may output the audio when the DRM content file is played.

Figure 9:
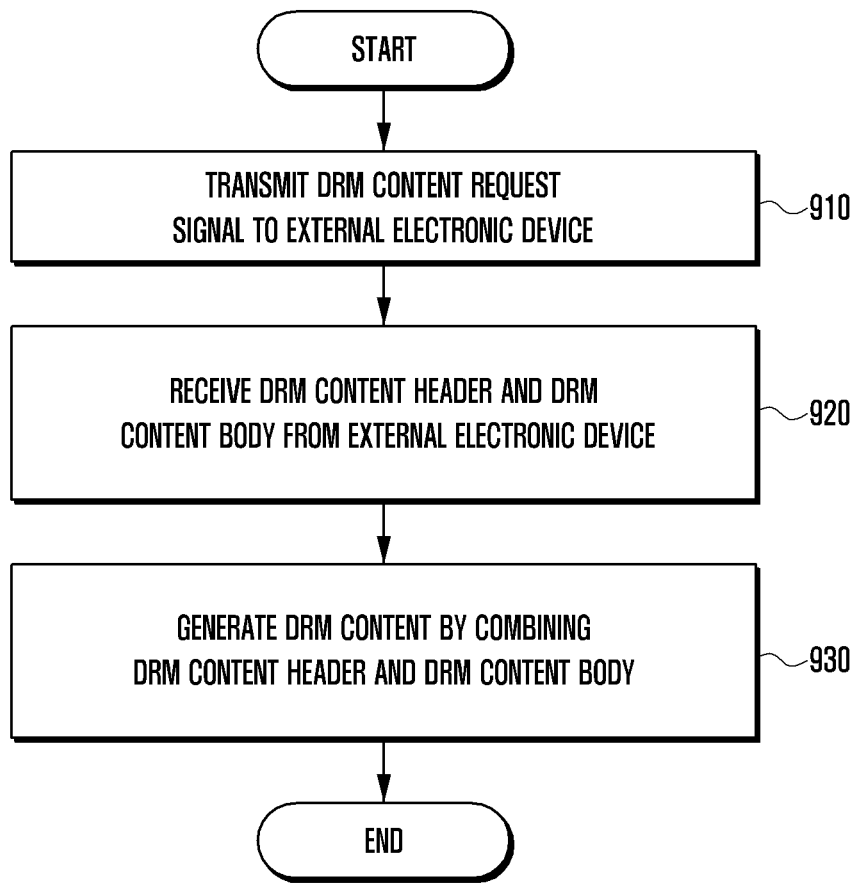
FIG. 9 is a flowchart illustrating a method of providing DRM content by an electronic device according to various embodiments of the present disclosure.

FIG. 9 is a flowchart illustrating a method of providing DRM content by an electronic device according to various embodiments of the present disclosure.

In operation 910, the client device 800 may transmit a DRM content request signal to the electronic device 100. The client device 800 may transmit information related to the request to the electronic device 100 along with the DRM content request signal. According to an embodiment, the client device 800 may individually transmit a DRM content header request signal or a DRM content body request signal to the electronic device 100. According to various embodiments, the client device 800 may autonomously combine a DRM content header and a DRM content body, or the client device 800 may make requests to the electronic device 100 for DRM content files (the DRM content header combined with the DRM content body).

In operation 920, the client device 800 may receive from the electronic device 100 the DRM content header or the DRM content body corresponding to the DRM content request signal.

In operation 930, the client device 800 may combine the DRM content header and the DRM content body. For example, the client device 800 may generate a single DRM content file by combining the DRM content header and the DRM content body.

Figure 10:
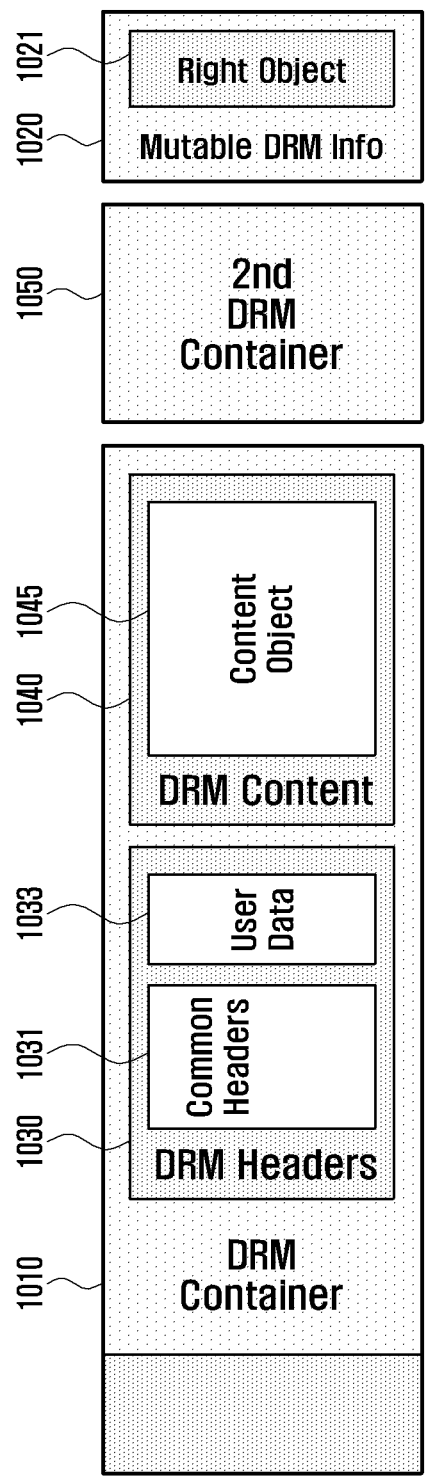
FIG. 10 illustrates an embodiment of a structure of a DRM content file according to various embodiments of the present disclosure.

FIG. 10 illustrates an embodiment of a structure of a DRM content file according to various embodiments of the present disclosure. FIG. 10 shows an example of the structure of a DRM content file having a multiple sections including a plurality of DRM containers (that is, multiple DRM content headers and DRM content bodies).

According to an embodiment of the present disclosure, the DRM content provided by the electronic device 100 may include a plurality of DRM containers 1010 and 1050, and may further include a mutable DRM information area 1020 that can extend additional information.

One DRM container may include a header area 1030 and a DRM content area 1040 including content information. That is, one DRM container may include a DRM content header and a DRM content body.

The header area 1030 may include a common header area 1031 and a user information area 1033. The common header area 1031 may include additional information on the DRM content (e.g., DRM metadata, etc.). The user information area 1033 may include information related to the user (e.g., the client device 800). That is, the header area 1030 may include diverse and adaptive information based on the user or a particular content.

The mutable DRM information area 1020 may include an editable area. For example, the mutable DRM information area 1020 can be utilized when inputting additional information to a particular DRM content. According to an embodiment, the mutable DRM information area 1020 may include a right object area 1021 that represents the use rights information for the DRM content. For example, the right object area 1021 may include a DRM license.

An example of a field of the DRM content according to an embodiment of the present disclosure is shown below.

TABLE 1

| Field name | Type | Purpose |
| --- | --- | --- |
| Version | Unit 8 | Version number |
| ContentTypeLen | Unit 8 | Length of the ContentType field |
| ContentURILen | Unit 8 | Length of the ContentURI field |
| ContentType | ContentTypeLen octets | The MIME media type of the plaintext data |
| ContentURI | ContentURILen octets | The unique identifier of this content object |
| HeadersLen | Uintvar | Length of the Header field |
| DataLen | Uintvar | Length of the Data field |
| Headers | headersLen octets | Headers define additional metadata about this content object |
| Data | DataLen octets | The encrypted data |

Table 1 shows an exemplary of a structure of a DRM content according to various embodiments of the present disclosure. According to an embodiment, the DRM content may include a field such as version, ContentLen, ContentURILen, ContentType, ContentURI, HeadersLen, DataLen, Headers, Data, etc. For example, the DRM content may include a field such as version information of the DRM encryption scheme, a content total length, a length of the Uniform Resources Identifier (URI) of the content, a content type, a URI of the content, a length of a header, a length of data, header, data, etc. According to an embodiment of the present disclosure, the data field associated with the contents of the original content may be a DRM content body, and fields related to information on the remaining DRM contents can be included in the DRM content header.

Referring to FIG. 10 and Table 1, a structure and a form of a single DRM content has been described as an example, but the structure and the form of the DRM content is not limited thereto and can be modified depending on various embodiments.

It may be understood that embodiments of the present disclosure can be implemented in software, hardware, or a combination thereof. Such software may be stored, for example, in a volatile or non-volatile storage device such as a ROM, etc., a memory such as a RAM, a memory chip, a memory device, or a memory IC, or an optical or magnetic recordable and a machine/computer-readable medium such as a CD, a DVD, a magnetic disk, or a magnetic tape, regardless of its ability to be erased or its ability to be re-recorded.

A method for utilizing a use log of a portable terminal and an apparatus using the same according to the present disclosure can be implemented by a computer or a portable terminal including a processor and a memory. It will be appreciated that memory is an example of a recording medium that can be read by a machine suitable for storing a program or programs including instructions for implementing embodiments of the present disclosure. Accordingly, the present disclosure includes a program including a code for implementing the apparatus or method described in any of the appended claims of the specification and a machine (computer or the like) readable storage medium for storing the program. Further, the program may be electronically carried by any medium such as a communication signal transferred through a wired or wireless connection, and the present disclosure appropriately includes equivalents thereof.

The method of using the use log of the portable terminal and the apparatus using the same may receive the program from a program providing apparatus connected wireless or through a wire and store the received program. Further, the user may selectively limit operations according to embodiments of the present disclosure within the user terminal or expand the operations to interworking with a server through a network.

What is claimed is:

1. An electronic device comprising:
a communication unit configured to transmit at least one of a Digital Rights Management (DRM) content file, a DRM content header, and a DRM content body to an external device based on a DRM request received from an external device, the DRM request including one of a DRM content header request, a DRM content body request, and a DRM content request;
a storage unit configured to store at least one of DRM content metadata, the DRM content header, the DRM content body, and the DRM content file; and
a controller configured to:
when the received DRM request is the DRM content header request: search for DRM metadata to locate the DRM metadata corresponding to the received DRM request by the external device; and generate the DRM content header based on the DRM metadata; and transmit the DRM content header through the communication unit;
when the received DRM request is the DRM content body request: search for the DRM content body to locate the DRM content body corresponding to the received DRM request; and transmit the DRM content body through the communication unit;
when the received DRM request is the DRM content request: search for the DRM metadata to locate the DRM metadata corresponding to the received DRM request by the external device; generate the DRM content header based on the DRM metadata; search for the DRM content body to locate the DRM content body corresponding to the received DRM request; and transmit the DRM content header and the DRM content body through the communication unit.

2. The electronic device of claim 1, wherein the controller is configured to package a DRM license with the DRM content header.

3. The electronic device of claim 1, wherein the DRM metadata comprises at least one of a content title, a content ID, a license Uniform Resource Locator (URL), and a DRM license.

4. The electronic device of claim 1, wherein the controller is configured to generate the DRM content file by combining the DRM content header and the DRM content body when the received DRM request is the DRM content request.

5. The electronic device of claim 4, wherein the controller is configured to transmit the generated DRM content file to the external device in response to the DRM content request of the external device.

6. The electronic device of claim 1, wherein the controller is configured to analyze the DRM content request received from the external device, and transmit the DRM content header separately when the DRM content request is for the DRM content header, and transmit the DRM content body separately when the DRM content request is for the DRM content body.

7. The electronic device of claim 1, wherein the controller is configured to pre-generate the DRM content body comprising an encrypted original content before receiving the DRM request from the external device.

8. The electronic device of claim 1, wherein the controller is configured to transmit at least one of the DRM content header, the DRM content body, and the DRM content file to the external device using a Content Delivery Network (CDN).

9. A method for providing a Digital Rights Management (DRM) content by an electronic device, comprising:
    receiving a DRM request from an external device, the DRM request including one of a DRM content header request, a DRM content body request, and a DRM content request;
    when the received DRM request is the DRM content header request: checking DRM metadata to locate the DRM metadata corresponding to the received DRM request from the external device; and generating a DRM content header on the basis of the DRM metadata; and transmitting the DRM content header;
    when the received DRM request is the DRM content body request: checking a DRM content body to locate the DRM content body corresponding to the received DRM request by the external device; and transmitting the DRM content body; and
    when the received DRM request is the DRM content request: checking the DRM metadata to locate the DRM metadata corresponding to the received DRM request from the external device; generating the DRM content header on the basis of the DRM metadata; checking the DRM content body to locate the DRM content body corresponding to the DRM request by the external device; and transmitting the DRM content header and the DRM content body to the external device.

10. The method of claim 9, wherein generating the DRM content header comprises packaging a DRM license with the DRM content header.

11. The method of claim 9, wherein the DRM content body has been pre-packaged by encrypting an original content prior to receiving the DRM request from the external device.

12. The method of claim 9, wherein the DRM metadata comprises at least one of a content title, a content ID, a license URL, and a DRM license.

13. The method of claim 9, wherein transmitting the DRM content header and the DRM content body to the external device comprises:
    generating a DRM content file by combining the DRM content header and the DRM content body; and
    transmitting the DRM content file to the external device.

14. The method of claim 9, wherein the DRM content header is packaged with an on-the-fly package scheme.

15. The method of claim 9, wherein the DRM content body is generated in a pre-packaging scheme.

16. A non-transitory computer-readable recording medium in which is recorded one or more programs with instructions for executing a method for providing a Digital Rights Management (DRM) content, the method of providing the DRM content comprising:
    receiving a DRM request from an external device, the DRM request including one of a DRM content header request, a DRM content body request, and a DRM content request;
    when the received DRM request is the DRM content header request: checking DRM metadata to locate the DRM metadata corresponding to the received DRM request from the external device; generating a DRM content header on the basis of the DRM metadata; and transmitting the DRM content header;
    when the received DRM request is the DRM content body request: checking a DRM content body to locate the DRM content body corresponding to the received DRM request by the external device; and transmitting the DRM content body; and
    when the received DRM request is the DRM content request: checking the DRM metadata to locate the DRM metadata corresponding to the received DRM request from the external device; packaging the DRM content header on the basis of the DRM metadata; checking the DRM content body to locate the DRM content body corresponding to the DRM request from the external device; and transmitting the DRM content header and the DRM content body to the external device.

* * * * *